United States Patent [19]

Naton

[11] Patent Number: 4,980,414

[45] Date of Patent: Dec. 25, 1990

[54] PLASTIC BODY FILLER

[75] Inventor: Paul E. Naton, North Ridgeville, Ohio

[73] Assignee: Oatey Company, Cleveland, Ohio

[21] Appl. No.: 334,678

[22] Filed: Apr. 6, 1989

[51] Int. Cl.$^5$ .............................................. C08G 63/48
[52] U.S. Cl. .................................. 525/30; 427/388.3; 521/182
[58] Field of Search ...................... 525/30; 427/388.3; 521/182

[56] References Cited

U.S. PATENT DOCUMENTS

| | | | |
|---|---|---|---|
| 1,840,597 | 1/1932 | Moss et al. | 528/265 |
| 2,852,489 | 9/1958 | Anas | 528/254 |
| 2,978,340 | 4/1961 | Veatch et al. | 523/217 |
| 3,230,184 | 1/1966 | Alford | 523/219 |
| 3,619,228 | 11/1971 | Hallonquist | 427/140 |
| 3,729,528 | 4/1973 | Werner et al. | 525/48 |
| 3,737,405 | 6/1973 | Linder et al. | 523/504 |
| 3,849,367 | 11/1974 | Mayer et al. | 523/514 |
| 3,873,475 | 3/1975 | Pechacek et al. | 523/509 |
| 4,053,448 | 10/1977 | Holle | 523/319 |
| 4,273,689 | 6/1981 | Smearing | 525/7 |
| 4,301,046 | 11/1981 | Schlossman | 524/601 |
| 4,529,757 | 6/1985 | Iseler et al. | 523/513 |
| 4,666,978 | 5/1987 | Storey et al. | 525/35 |

*Primary Examiner*—Morton Foelak
*Assistant Examiner*—Kathyrne E. Shelborne
*Attorney, Agent, or Firm*—Renner, Otto, Boisselle & Sklar

[57] ABSTRACT

A curable polyester composition having improved properties is described, and the curable polyester composition comprises:
(A) at least one unsaturated polyester resin;
(B) at least one hydrocarbon monomer copolymerizable with the polyester; and
(C) at least one aryl sulfonamide-aldehyde resin.

When the curable polyester composition is to be used as a plastic body filler, the curable polyester composition generally will be modified to include (D) at least one inorganic filler which may comprise a mixture of an inorganic powder and inorganic hollow microspheres.

The curable polyester resin compositions of the invention are useful as plastic body fillers for repairing metal surfaces, and the curable compositions have been found to be particularly useful and advantageous as plastic body fillers for galvanized steel.

22 Claims, No Drawings

PLASTIC BODY FILLER

FIELD OF THE INVENTION

This invention relates to curable polyester compositions, and more particularly, to curable polyester resins useful as plastic body fillers. The invention also relates to a process for repairing and patching metal surfaces, particularly galvanized steel.

BACKGROUND OF THE INVENTION

The use of thermosetting resinous materials as patching compounds for damaged or dented sheet metal is well known. For example, unsaturated polyester resin compositions have been widely used for this purpose.

The unsaturated polyester resin compounds generally utilized in patching compositions comprise an unsaturated polyester, a monomeric material capable of copolymerizing with the unsaturated polyester, finely divided fillers and polymerization accelerators and promoters. Generally, the unsaturated polyester resin is dissolved in a liquid polymerizable monomer, and the filler materials are added. Just prior to use, a free radical initiator is added to the unsaturated polyester filling compounds to cure the resin to a solid material on standing.

The art teaches that the incorporation of inorganic mineral powders such as talc, clay, calcium carbonate or silica sand in a binder imparts impact and structural strength as well as workability to the resin composition. U.S. Pat. No. 3,230,184 teaches that where high strength-to-weight ratios are required, hollow glass spheres should be incorporated into the unsaturated polyester resin. U.S. Pat. No. 3,873,475 discloses incorporating a mixture of hollow microspheres and an inorganic filler powder in an unsaturated polyester resin to prepare a thermosetting resin formulation suitable as a metal patching material.

Metal surfaces of the parts to be used in automotive bodies, household appliances, etc., having dents, cracks or holes are conventionally repaired with inorganic filler modified thermosetting unsaturated polyester patching compositions in order to eliminate these imperfections. One method for eliminating such imperfections involves filling the dents with a curable patching composition, allowing patching compositions to cure and then subjecting the filled imperfections to a finishing operation such as sanding, buffing, grinding, etc., to obtain a smooth, uniform surface which blends with the metal surface being repaired so that the repair is indistinguishable from the remainder of the metal surface after a coat of paint has been applied to the surface. There is a continuing interest and desire in the metal repair industry, and particularly in the repair of automotive bodies, for a patching composition which, after application to a metal cavity or dent, hardens rapidly, and when hardened, is readily susceptible to mechanical finishing procedures such as being easily filed and readily sanded with good featherability. That is, the mechanically finished filled imperfection blends in well with the adjacent metal surfaces.

When the metal requiring repair is galvanized steel, it has been difficult to ensure adhesion of the body filler to the galvanized steel surfaces. Generally, the galvanized steel surfaces have been pretreated in order to provide the desirable adhesion of the body filler to the galvanized steel. The pretreatment generally has involved thoroughly grinding the galvanized surface to remove the zinc coating, sanding of the surface, acid etching of the surface to remove any remaining galvanized coating, neutralization of the acid, followed by cleaning and drying of the surface. In many instances, this treated surface is coated with an epoxy/urethane primer to ensure corrosion protection (since the galvanized surface has been removed) followed by light sanding of the primer. The body filler can then be applied to the pretreated galvanized steel surfaces, and the adhesion of the body filler to the surface is generally acceptable. However, the above processing which is required to prepare galvanized steel for body fillers is both time-consuming and costly, and the corrosion protection which is lost by removal of the galvanized surface provided by the primer is often not the equivalent of the corrosion protection afforded by the original galvanized surface.

SUMMARY OF THE INVENTION

A curable polyester composition having improved properties is described, and the curable polyester composition comprises:

(A) at least one unsaturated polyester resin;
(B) at least one hydrocarbon monomer copolymerizable with the polyester; and
(C) at least one aryl sulfonamide-aldehyde resin.

When the curable polyester composition is to be used as a plastic body filler, the curable polyester composition generally will be modified to include (D) at least one inorganic filler which may comprise a mixture of an inorganic powder and inorganic hollow microspheres.

The curable polyester resin compositions of the invention are useful as plastic body fillers for repairing metal surfaces, and the curable compositions have been found to be particularly useful and advantageous as plastic body fillers for galvanized steel.

DESCRIPTION OF THE PREFERRED EMBODIMENTS

The first component in the curable polyester resin compositions of the present invention is (A) at least one unsaturated polyester resin. The term "unsaturated polyester resin" as used in the specification and claims refers to the well-known class of cross-linkable polyester compounds obtained by the condensation of unsaturated polybasic acids or anhydrides with polyhydroxy compounds, and the polymeric chain may optionally contain varying amounts of other saturated or aromatic dibasic acids and anhydrides which are not subject to cross-linking in order to reduce the degree of crosslinking of the hardened product.

Examples of unsaturated dibasic organic acids which can be utilized in the preparation of polyester resins include maleic acid, fumaric acid, chloromaleic acid, aconitic acid, glutaconic acid, citraconic acid, itaconic acid, mesaconic acid, isophthalic acid, terephthalic acid, etc. Examples of dibasic acid anhydrides which can be utilized include maleic anhydride, phthalic anhydride, etc.

A variety of polyhydric alcohols have been utilized in the preparation of polyester resins. Examples of useful polyhydric alcohols include di- and trihydroxy compounds such as ethylene glycol, propylene glycol, diethylene glycol, dipropylene glycol, glycerol, trimethylolpropane, trimethylolethane, pentaerythritol, tetramethylene glycol, decamethylene glycol, polypropylene glycol, 1,2-butanediol, 1,3-butanediol and bisphenol A. Glycerol, ethylene glycol and propylene glycol are the most commonly used polyhydric alcohols in the preparation of polyester resins useful in the present invention.

Polyester resins are formed by heating the polybasic acid or anhydride with the polyhydric alcohol at temperatures sufficient to effect the reaction and remove water as it is formed. The techniques for carrying out this condensation reaction are well-known to those skilled in the art. Upon completion of the condensation reaction, the polyester resin can be recovered as a curable polymer composition, or the polyester may be combined with a liquid hydrocarbon monomer which is copolymerizable with the ester.

Some examples of polyester resin compositions include compositions prepared by condensation reaction of: maleic acid anhydride, phthalic acid anhydride and propylene glycol; maleic anhydride, diethylene glycol and dipropylene glycol; maleic anhydride and propylene glycol; maleic anhydride, phthalic anhydride and propylene glycol; maleic anhydride and butanediol; etc.

Specific examples of curable polyester resins useful in the patching compositions of the present invention include the reaction products of: one mole of maleic anhydride, 3 moles of phthalic anhydride, and 4 moles of diethylene glycol; one mole of maleic anhydride with one mole of dipropylene glycol, 3 moles of maleic anhydride, one mole of phthalic anhydride and 4.4 moles of propylene glycol; 2 moles of maleic anhydride, one mole of diethylene glycol and one mole of dipropylene glycol; one mole of maleic anhydride with 1.05 moles of 1,3-butanediol; one mole of maleic anhydride, 2 moles of isophthalic anhydride, 6 moles of adipic acid and 9.1 moles of diethylene glycol.

It is well known in the art that the properties of the cured polyester resins derived from polycarboxylic acids and polyols of the types described above can be modified and controlled as desired by the choice of polycarboxylic acid and polyol, choice of mixtures of dibasic acids to be reacted with one or more polyols; the ratios of the dibasic acids and polyols included in the preparation of the unsaturated polyester resins, etc. Properties such as toughness, elongation, heatdistortion and reactivity can be modified in this manner.

The second component in the curable polyester resin compositions of the present invention is (B) at least one hydrocarbon monomer which is copolymerizable with the unsaturated polyester resin (A). The monomer is generally a liquid and will generally contain at least one polymerizable $>C=CH_2$ group. Preferably, the liquid monomer is one in which the saturated polyester resin is soluble and which is copolymerizable with the unsaturated polyester developing a cross-linked or thermoset structure.

In one embodiment, the copolymerizable monomer (B) is characterized by the formula $$CH_2=CH-R \qquad (I)$$

wherein R is a group having an unsaturated carbon-to-carbon, carbon-to-oxygen or carbon-to-nitrogen group in conjunction with the vinyl group. For example, the R groups may be aryl, ketonic, heterocyclic, carboxy and amidyl. Specific examples of copolymerizable monomers include styrene, halogenated styrenes such as chlorostyrene, iodostyrene, fluorostyrene, dichlorostyrene, etc.; alkyl-substituted styrene such as p-methylstyrene, p-ethylstyrene, etc.; alkoxy and aryl oxy-substituted styrene such as p-ethoxystyrene, p-propoxystyrene, p-phenoxystyrene, etc.

Other copolymerizable monomers within the above Formula I include ethyl vinyl ketone, vinyl pyridine, vinyl pyrrole, acrylonitrile, acrylic acid, acrylamide, methyl acrylate, butyl acrylate, octyl acrylate, lauryl acrylate, etc. The generally preferred copolymerizable monomers are the alkenyl aromatic monomers such as styrene, alpha-methyl styrene, vinyl toluene and halogensubstituted styrenes.

The third component (C) which is present in the curable polyester compositions of the present invention is at least one aryl sulfonamide-aldehyde resin.

The aryl sulfonamides which are reacted with the aldehyde to form the resin are benzene sulfonamides including the ring-substituted derivatives of benzene sulfonamide in which the substituent may be organic including alkyl, aryl, aralkyl, etc. groups or inorganic groups such as halogen, nitro, etc. The aryl sulfonamides also include aryl polysulfonamides. Among the specific aryl sulfonamides which may be used are benzene sulfonamide, ortho-, para- or meta-toluene sulfonamide, ortho-, para-, or meta-ethylbenzene sulfonamide, diphenyl sulfonamide, phenanthracene sulfonamide, naphthalene sulfonamides, toluene disulfonamides, ortho-, meta-, and para-chlorobenzene sulfonamides, nitro benzene sulfonamides, etc. Mixtures of two or more of any of the above-described aryl sulfonamides may be used.

The aldehydes which may be reacted with the sulfonamides to form the desired resins include formaldehyde, acetaldehyde, butyraldehyde, propionaldehyde, isobutyraldehyde, hexaldehyde, 2-ethyl hexaldehyde, benzaldehyde, crotonaldehyde, cinnamaldehyde, acrolein methacrolein, furfural, glyoxal, etc. Polymeric aldehydes such as paraformaldehyde, paraldehyde, trioxymethylene, etc., or compounds which release aldehydes under reaction conditions, such as hexamethylenetetramine, may be used.

The aryl sulfonamide-aldehyde resins generally may be prepared by reacting approximately equimolar amounts of the aryl sulfonamide and the aldehyde, generally in the presence of a catalyst. Acid and alkaline catalysts have been used. In some instances, an excess of the aldehyde can be reacted to provide tougher and harder resins. In one example, equimolar amounts of paratoluene sulfonamide and formaldehyde are heated together under reflux for 10 hours at 150° C. The resin obtained in this manner is washed with water to remove excess reactants and thereafter dried. The resin is soluble in ketones, esters, alcohols and aromatic solvents but is insoluble in aliphatic hydrocarbons. Aryl sulfonamide-aldehyde resins having similar properties can be prepared by varying the sulfonamide and/or aldehyde, and by varying the amounts and relative proportions of the two reactants.

The presently preferred aryl sulfonamide-aldehyde resins in the curable polyester resin compositions of the present invention are toluene sulfonamide-formaldehyde resins. One such commercially available resin is a paratoluene sulfonamide-formaldehyde resin available under the general trade designation Sulfonex EST-100 (Estron Chemical, Inc., Calvert City, Kentucky).

When the curable polyester resin compositions of the present invention are to be utilized as plastic body fillers, the compositions generally will contain (D) at least one inorganic inert filler. Inorganic and inert fillers are included in the compositions of the present invention to improve working viscosity and structural strength, and to reduce costs. The inorganic fillers preferably are fine powders having an average particle size of less than about 50 microns to facilitate blending. The inorganic fillers which can be utilized include amorphous silica, silica flour, talc, magnesium silicate, calcium carbonate, clay, whiting, shell flour, wood flour, alumina, antimony trioxide, asbestos powder, barium sulfate, calcined clays, China clays, magnesium oxide, mica powder, fumed silica, etc. A preferred filler is talc.

When a lightweight body filler is desired, the inorganic filler material incorporated into the polyester resin composition of the invention comprises a mixture of inorganic powders and inorganic hollow microspheres. The inorganic hollow microspheres act as a filler, and they also decrease the density of the resin composition while also increasing its strength. The hollow inorganic microspheres used in the compositions of the present invention are preferably glass microspheres or microbubbles. Useable hollow microspheres or microbubbles are disclosed in U.S. Pat. No. 3,365,315. The walls of these microbubbles are made by expanding solid glass particles at temperatures above 1000° C. to form tiny hollow spheroids. One type of hollow microspheres found useful in the present invention are derived from soda lime borosilicate glass. Hollow glass microspheres are available commercially from companies such as the 3M Company.

In addition to the inorganic powder and microsphere fillers, the curable polyester resin compositions and plastic body fillers of the present invention also may contain other types of fillers to provide the desirable properties. For example, reinforcing fillers may be added to the compositions of the invention. Reinforcing fibers may be added to the composition in amounts of up to about 25% by weight of the total composition. Examples of suitable reinforcing fibers include glass fibers, cotton fibers, sisal fibers, Kevlar fibers, asbestos fibers, and other fibers such as metal fibers and whiskers, boron fibers and whiskers, graphite fibers and whiskers, etc. Metal fillers such as metal particles and flakes including aluminum flake, steel flake, as well as oxides and sulfides of metal also may be included as filler. The fillers incorporated into the polyester resin composition of the present invention, and the amounts to be incorporated, may be adjusted to achieve the desired hardness and sandability of the patching compound.

The curable polyester resin compositions of the present invention which are useful as plastic body fillers generally will comprise (A) from about 25% to about 50% by weight of at least one unsaturated polyester resin as described above;

(B) from about 10% to about 20% by weight of at least one monomer solvent which is copolymerizable with the polyester;

(C) from about 1% to about 8% by weight of at least one aryl sulfonamide-aldehyde condensation resin; and (D) from about 40% to about 65% by weight of at least one inorganic filler material. In another embodiment, the curable polyester resin compositions will comprise from about 30% to about 35% by weight of the unsaturated polyester resin (A); from about 11% to about 15% by weight of the copolymerizable monomer (B); from about 1% to about 5% by weight of the aryl sulfonamide-formaldehyde condensation resin (C); and from about 50% to about 60% by weight of the inorganic filler material (D). When low density compositions are desired, the polyester resin compositions of the present invention will comprise from about 40% to about 50% by weight of inorganic powders and from about 3% to about 15% by weight of glass microspheres.

The compositions of the present invention should be thoroughly blended before use. The unsaturated polyester resin and the copolymerizable monomer (B) may be blended, and then the sulfonamide-aldehyde resin (C) and the filler or fillers are added with mixing. If desired, small amounts of pigment or colorants such as titanium dioxide, carbon black or a dye or other colorants may be added to the mixture to serve as a guide for uniform mixing and/or to impart desirable colors to the curable resin compositions.

Thorough mixing of the blend is essential in order to produce uniform mixtures since non-uniform mixtures will result in non-uniform adhesion to metal substrates.

Immediately before the polyester resin compositions of the present invention are to be utilized, a small effective amount of a cross-linking catalyst or polymerization initiator is added to the composition. Typical cross-linking catalysts are free radical catalysts including organic peroxides and hydroperoxides such as benzoyl peroxide, cumyl peroxide, methyl ethyl ketone peroxide, t-butyl hydroperoxide, cumene hydroperoxide, etc. The amount of cross-linking agent blended into the curable polyester resin compositions of the invention should be sufficient to effect the desired curing and hardening of the composition. As a rule, amounts of from about 0.1% to about 5% by weight based on the weight of the unsaturated polyester resin (A) are effective although amounts in the range of 0.5% to 2% by weight are sufficient.

The mixture of thermosetting polyester resin, copolymerizable monomer, aryl sulfonamide-aldehyde resin, and inorganic filler has the consistency of a paste. As noted above, immediately prior to application to a metal surface such as a dented metal surface, the paste is mixed with a cross-linking free radical catalyst such as benzoylperoxide to accelerate hardening of the patching composition. At the time of application, the filled thermosetting polyester patching composition is partially thixotropic and can be formed and shaped to the configuration of the dent. Upon curing, the composition becomes a hardened thermoset mass of resin which is confined within the dent.

The curable polyester resin compositions of the present invention, after incorporation of the free radical catalyst, can be applied to the metal surfaces to be repaired by any known technique. Generally, a sufficient amount of the composition is applied to the metal surface to fill the imperfection, and the composition is allowed to cure and harden. It has been observed that the filling compositions of the present invention containing the aryl sulfonamide-aldehyde resin (C) do not shrink to any substantial extent on hardening. The incorporation of the aryl sulfonamide-aldehyde resins into the polyester resin compositions also provides other unusual and desirable properties to the hardened body filler. In particular, the body fillers of the present invention containing the aryl sulfonamide-aldehyde resins exhibit increased adhesion to galvanized steel which, heretofore, has required special and severe pretreatment in order to obtain adequate bonding between the galvanized steel and body fillers. Prior to this invention, the galvanized surface had to be ground and sanded in order to remove the zinc coating. Such treatments obviously reduce the corrosion protection, increase the cost of repairing galvanized steel surfaces, and when the galvanized steel is used on a new automobile, the corrosion warranty is thus voided.

Utilizing the plastic body fillers of the present invention, galvanized steel can be repaired without any damage to the galvanized surface, and it is only necessary to (1) wipe the dust from the surface of the galvanized steel, (2) apply and harden the body filler, and (3) prime and paint. In addition to superior adhesion to metal surfaces, particularly galvanized steel, the patching compositions of the present invention also exhibit improved and excellent fileability, sandability, featherability and paintability. The fileability is a measure of the ease of hand-filing of the hardened patching compositions. It is desirable that the hardened patching composition be sufficiently soft and pliable to be hand-filed easily after the patching composition has hardened. Sandability is a measure of whether the patching composition applied to the metal surface can be sanded to trade specifications after the curing agent has been added to the composition and the composition has hardened. Sandability is rated excellent if (1) the sandpaper used in the sanding operation does not become plugged with patching composition, (2) the hardened composition can be sanded with relative ease, and (3) the composition feathers well without any portion thereof fraying or breaking off from the main portions of the hardened mass or patching material. Paintability is a measure of appearance of the hardened composition after sanding. It is desirable that the sanded composition has a surface which is free of blisters and pinholes. The compositions of the present invention after application to and curing on a metal surface are easily sanded and provide a smooth film with an excellent feather edge which blends into the paint film and reduces the need for any special treatment prior to painting.

The plastic patching compositions of the present invention cure to a hardened patch even when thick coatings are required. It also has been observed that the presence of the aryl sulfonamide-aldehyde resin in the polyester resin compositions of the present invention serves as a viscosity depressant. For example, polyester resin formulations of the invention can be prepared containing up to about 75% of talc, and the composition remains smooth and creamy. In the absence of the aryl sulfonamide-aldehyde resin, it is difficult to incorporate more than 50% of talc in an otherwise similar polyester resin formulation.

The following examples illustrate the polyester resin compositions and the plastic body filler compositions of the present invention. Unless otherwise indicated in the following examples, and elsewhere in the specification and claims, all parts and percentages are by weight and temperatures are in degrees centigrade.

| Ingredients | Wt. % |
| --- | --- |
| Example 1 | |
| Unsaturated polyester resin | 70 |
| Styrene | 20 |
| Toluene sulfonamide-formaldehyde condensation resin | 10 |
| Example 2 | |
| Unsaturated polyester resin (Polylite ® polyester resin, Reichhold Chemicals, Inc.) | 33 |
| Styrene monomer | 15 |
| Toluene sulfonamide-formaldehyde | 3 |

| Ingredients | Wt. % |
| --- | --- |
| resin (Sulfonex EST-100) | |
| Talc | 49 |
| Example 3 | |
| Unsaturated polyester resin (Polylite ® polyester resin, Reichhold Chemicals, Inc.) | 33 |
| Styrene monomer | 15 |
| Toluene sulfonamide-formaldehyde resin (Sulfonex EST-100) | 3 |
| Talc | 44 |
| Microspheres (soda lime borosilicate glass) | 5 |
| Example 4 | |
| Unsaturated polyester resin* | 30 |
| Styrene monomer | 15 |
| Toluene sulfonamide-formaldehyde resin (Sulfonex EST-100) | 2.9 |
| Talc | 47.1 |
| Glass microspheres | 4 |
| Colorant | 1 |

*A commercially available premixed resin manufactured by the commercial resin division of Interplastic Corporation (Code COR139-100) supplied as a solution in about 30–35% styrene.

Just prior to use, the above polyester resin formulations are prepared for curing by incorporating therein a small amount such as from 1–2% of a paste hardener which comprises a 50:50 weight mixture of benzoyl peroxide and dioctylphthalate. The paste is thoroughly blended into the composition providing a gel time of about 5–7 minutes at room temperature. The compositions achieve their ultimate hardness in about 60 minutes.

The curable polyester resin compositions and plastic body fillers of the present invention can be applied to and utilized in repairing and patching all types of metals and alloys including, iron, zinc, dicast, copper and brass. The compositions are particularly useful, as indicated above, for patching and repairing galvanized steel since excellent adhesion to the galvanized steel can be obtained with a minimum of preparation.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A curable polyester composition comprising
   (A) at least one unsaturated polyester resin;
   (B) at least one hydrocarbon monomer copolymerizable with the polyester; and
   (C) at least one aryl sulfonamide-aldehyde resin.

2. The composition of claim 1 wherein the unsaturated polyester resin (A) comprises the condensation reaction product of at least one ethylenically unsaturated dicarboxylic acid and at least one polyhydric alcohol.

3. The composition of claim 1 wherein the hydrocarbon monomer (B) is at least one liquid monomer containing a $>C=CH_2$ group.

4. The composition of claim 8 wherein the monomer is a styrene.

5. The composition of claim 1 wherein the resin (C) is an aryl sulfonamide-formaldehyde resin.

6. The composition of claim 5 wherein the aryl sulfonamide-formaldehyde resin is a toluene sulfonamide formaldehyde resin.

7. The composition of claim 1 also containing (D) at least one inorganic filler.

8. The composition of claim 7 wherein the inorganic filler (D) comprises a mixture of inorganic powders and inorganic hollow microspheres.

9. The composition of claim 8 wherein the inorganic hollow microspheres are glass microspheres.

10. A curable polyester resin composition comprising
   (A) from about 25% to about 50% by weight of at least one unsaturated polyester resin;
   (B) from about 10% to about 20% by weight of at least one monomer solvent which is copolymerizable with the polyester;
   (C) from about 1% to about 8% by weight of at least one aryl sulfonamide-aldehyde condensation resin; and
   (D) from about 40% to about 65% by weight of at least one inorganic filler material.

11. The resin composition of claim 10 wherein the unsaturated polyester resin (A) comprises the condensation reaction product of at least one ethylenically unsaturated dicarboxylic acid and at least one polyhydric alcohol.

12. The resin composition of claim 10 wherein the monomer solvent (B) is at least one liquid monomer containing a $>C=CH_2$ group.

13. The resin composition of claim 12 wherein the monomer is a styrene monomer.

14. The resin composition of claim 10 wherein the condensation resin (C) is an aryl sulfonamide-formaldehyde resin.

15. The resin composition of claim 10 wherein the condensation resin (C) is a toluene sulfonamide-formaldehyde resin.

16. The resin composition of claim 10 wherein (D) is a mixture of inorganic powders and inorganic hollow microspheres.

17. The resin composition of claim 16 wherein the inorganic hollow microspheres are glass microspheres.

18. The resin composition of claim 10 containing from about 1% to about 5% of a toluene sulfonamideformaldehyde resin.

19. The resin composition of claim 10 containing (D) from about 40% to about 50% by weight of at least one inorganic powder and from about 3% to about 15% by weight of glass microspheres.

20. The resin composition of claim 10 containing from about 30% to about 35% by weight of the unsaturated polyester resin (A)

21. A resin composition for repairing the surface of metal parts including galvanized steel which comprises
   (A) from about 30% to about 35% by weight of at least one unsaturated polyester resin;
   (B) from about 11% to about 15% by weight of at least one liquid styrene monomer solvent;
   (C) from about 1% to about 5% by weight of at least one toluene sulfonamide-formaldehyde condensation resin; and
   (D) from about 40% to about 60% by weight of at least one inorganic filler material.

22. The resin composition of claim 21 containing (D) about 40% to about 50% of inorganic powders and from about 3% to about 15% by weight of glass microspheres.

* * * * *